US011027355B2

(12) United States Patent
Johnson et al.

(10) Patent No.: US 11,027,355 B2
(45) Date of Patent: Jun. 8, 2021

(54) WELDING POWER SUPPLIES, WIRE FEEDERS, AND SYSTEMS TO MEASURE A WELD CIRCUIT RESISTANCE VIA COMMUNICATIONS OVER THE WELD CIRCUIT

(71) Applicant: Illinois Tool Works Inc., Glenview, IL (US)

(72) Inventors: Nathan W. Johnson, Kaukauna, WI (US); Brian L. Ott, Sherwood, WI (US)

(73) Assignee: ILLINOIS TOOL WORKS, Glenview, IL (US)

( * ) Notice: Subject to any disclaimer, the term of this patent is extended or adjusted under 35 U.S.C. 154(b) by 765 days.

(21) Appl. No.: 15/454,299

(22) Filed: Mar. 9, 2017

(65) Prior Publication Data

US 2018/0257162 A1    Sep. 13, 2018

(51) Int. Cl.
*B23K 9/10*     (2006.01)
*B23K 9/09*     (2006.01)
*B23K 9/095*    (2006.01)

(52) U.S. Cl.
CPC .............. *B23K 9/1006* (2013.01); *B23K 9/09* (2013.01); *B23K 9/0953* (2013.01);
(Continued)

(58) Field of Classification Search
CPC .......... B23K 9/09; B23K 9/0953; B23K 9/10; B23K 9/1006; B23K 9/1043; B23K 9/1056; B23K 9/1062

(Continued)

(56) References Cited

U.S. PATENT DOCUMENTS 5,043,557 A * 8/1991 Tabata ................. B23K 9/1056
                                               219/130.51
6,066,832 A   5/2000 Uecker
(Continued)

FOREIGN PATENT DOCUMENTS

CN      1042856 A    6/1990
CN    201320650 Y   10/2009
(Continued)

OTHER PUBLICATIONS

Int'l Search Report and Written Opinion PCT/US/2018/019709 dated Jun. 14, 2018 (16 pages).

(Continued)

*Primary Examiner* — Robert J Utama
*Assistant Examiner* — Ayub A Maye
(74) *Attorney, Agent, or Firm* — McAndrews, Held & Malloy, Ltd.

(57) ABSTRACT

Welding power supplies, wire feeders, and systems to measure a weld circuit resistance via communications over the weld circuit are disclosed. An example welding-type power supply includes: a power converter configured to: convert input power to output a current pulse via a weld circuit; and convert the input power to output welding-type power via the weld circuit; a voltage monitor configured to measure a power supply output voltage of the current pulse; a receiver circuit configured to receive, via the weld circuit, a communication comprising a second voltage measurement; and a controller configured to: determine a resistance of a portion of the weld circuit based on the power supply output voltage measurement, the second voltage measurement, and a weld circuit current measurement; and control the power converter to convert the input power to output the welding-type power based on a weld voltage setpoint and the impedance.

10 Claims, 6 Drawing Sheets

(52) U.S. Cl.
CPC .......... *B23K 9/1043* (2013.01); *B23K 9/1056* (2013.01); *B23K 9/1062* (2013.01)

(58) Field of Classification Search
USPC ...... 219/130.1, 130.01, 130.31, 130.5, 137.7
See application file for complete search history.

(56) References Cited

U.S. PATENT DOCUMENTS

| | | | |
|---|---|---|---|
| 6,248,976 B1* | 6/2001 | Blankenship | B23K 9/1043 |
| | | | 219/130.21 |
| 6,570,130 B1 | 5/2003 | Kooken | |
| 6,624,388 B1* | 9/2003 | Blankenship | B23K 9/1062 |
| | | | 219/130.5 |
| 6,906,285 B2* | 6/2005 | Zucker | B23K 9/124 |
| | | | 219/132 |
| 7,180,029 B2 | 2/2007 | Ott | |
| 8,330,077 B2 | 12/2012 | Rappl | |
| 8,592,724 B2 | 11/2013 | Ott | |
| 8,779,329 B2 | 7/2014 | Rappl | |
| 8,957,344 B2 | 2/2015 | Rappl | |
| 9,012,807 B2 | 4/2015 | Ott | |
| 9,162,311 B2 | 10/2015 | Ott | |
| 9,511,444 B2* | 12/2016 | Marschke | B23K 9/1062 |
| 9,662,735 B2* | 5/2017 | Salsich | B23K 9/124 |
| 9,808,882 B2* | 11/2017 | Hutchison | B23K 9/09 |
| 2002/0113045 A1 | 8/2002 | Blankenshp | |
| 2004/0079740 A1* | 4/2004 | Myers | B23K 9/0953 |
| | | | 219/130.51 |
| 2006/0102698 A1 | 5/2006 | Ihde | |
| 2007/0221642 A1 | 9/2007 | Era | |
| 2008/0296276 A1 | 12/2008 | Schartner | |
| 2010/0133250 A1 | 6/2010 | Sardy | |
| 2010/0301029 A1 | 12/2010 | Meckler | |
| 2010/0314371 A1 | 12/2010 | Davidson | |
| 2011/0309054 A1* | 12/2011 | Salsich | B23K 9/09 |
| | | | 219/108 |
| 2012/0097644 A1* | 4/2012 | Ott | B23K 9/095 |
| | | | 219/108 |
| 2013/0264319 A1 | 10/2013 | Temby | |
| 2013/0327747 A1 | 12/2013 | Dantinne | |
| 2013/0327754 A1* | 12/2013 | Salsich | B23K 9/124 |
| | | | 219/137.71 |
| 2014/0001169 A1 | 1/2014 | Enyedy | |
| 2014/0076872 A1 | 3/2014 | Ott | |
| 2014/0131320 A1* | 5/2014 | Hearn | B23K 9/092 |
| | | | 219/74 |
| 2014/0263256 A1* | 9/2014 | Rappl | B23K 37/0247 |
| | | | 219/137.71 |
| 2014/0312011 A1* | 10/2014 | Hosoya | B23K 10/02 |
| | | | 219/121.46 |
| 2015/0136746 A1 | 5/2015 | Rappl | |
| 2015/0158104 A1 | 6/2015 | Rappl | |
| 2015/0196970 A1 | 7/2015 | Denis | |
| 2015/0224591 A1 | 8/2015 | Ott | |
| 2015/0273611 A1 | 10/2015 | Denis | |
| 2016/0158868 A1 | 6/2016 | Trinnes | |
| 2017/0021442 A1 | 1/2017 | Denis | |
| 2017/0120364 A1* | 5/2017 | Zucker | B23K 9/0953 |

FOREIGN PATENT DOCUMENTS

| | | |
|---|---|---|
| CN | 101856764 A | 10/2010 |
| CN | 106461738 A | 2/2017 |
| CN | 108390423 A | 8/2018 |
| EP | 0575082 | 12/1993 |
| EP | 2444191 A2 | 4/2012 |
| EP | 2444191 A3 | 4/2012 |
| EP | 2960001 | 12/2015 |
| KR | 20120048876 | 5/2012 |
| WO | 2016099642 | 6/2016 |

OTHER PUBLICATIONS

Int'l Search Report and Written Opinion PCT/US2018/019678 dated Jun. 26, 2018 (13 pages).
Canadian Patent Office, Requisition by Examiner in Application No. 3,053,586 dated Oct. 19, 2020 (4 pages).

* cited by examiner

WELDING POWER SUPPLIES, WIRE FEEDERS, AND SYSTEMS TO MEASURE A WELD CIRCUIT RESISTANCE VIA COMMUNICATIONS OVER THE WELD CIRCUIT

RELATED APPLICATIONS

This patent application is related to U.S. patent application Ser. No. 15/238,585, filed Aug. 16, 2016, entitled "Welding Power Supplies, Wire Feeders, and Systems to Compensate a Weld Voltage Via Communications Over a Weld Circuit," and is related to U.S. patent application Ser. No. 15/238,589, filed Aug. 16, 2016, entitled "Welding Power Supplies, Wire Feeders, and Systems to Compensate a Weld Voltage Via Communications Over a Weld Circuit." The entireties of U.S. patent application Ser. No. 15/238,585 and U.S. patent application Ser. No. 15/238,589 are incorporated herein by reference.

BACKGROUND

The invention relates generally to welding systems and, more particularly, to welding power supplies, wire feeders, and systems to measure a weld circuit resistance via communications over the weld circuit.

Some welding applications, such as coal-fired boiler repair, shipyard work, and so forth, may position a welding location or workpiece large distances from a multi-process welding power source. The power source provides conditioned power for the welding application, and the welder must pull and monitor a long welding power cable extending from the power source to the welding location. Accordingly, the location of power terminals (e.g., plugs) and controls on or proximate to the welding power source may require the user to stop welding and return to the power source to plug in auxiliary devices, make changes to the welding process, and so forth. In many applications, this may entail walking back considerable distances, through sometimes complex and intricate work environments. Additionally, weld cables (and, particularly, long weld cables) introduce a non-negligible voltage drop between the power source and the site of the work (e.g., the wire feeder, the torch).

Accordingly, there exists a need for systems and methods for providing accurate weld voltages that correspond to the weld voltages set on the weld equipment, and particularly without requiring additional communications cables or using wireless communications equipment that can be unreliable in a weld environment.

SUMMARY

Welding power supplies, wire feeders, and systems to compensate a weld voltage via communications over a weld circuit are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
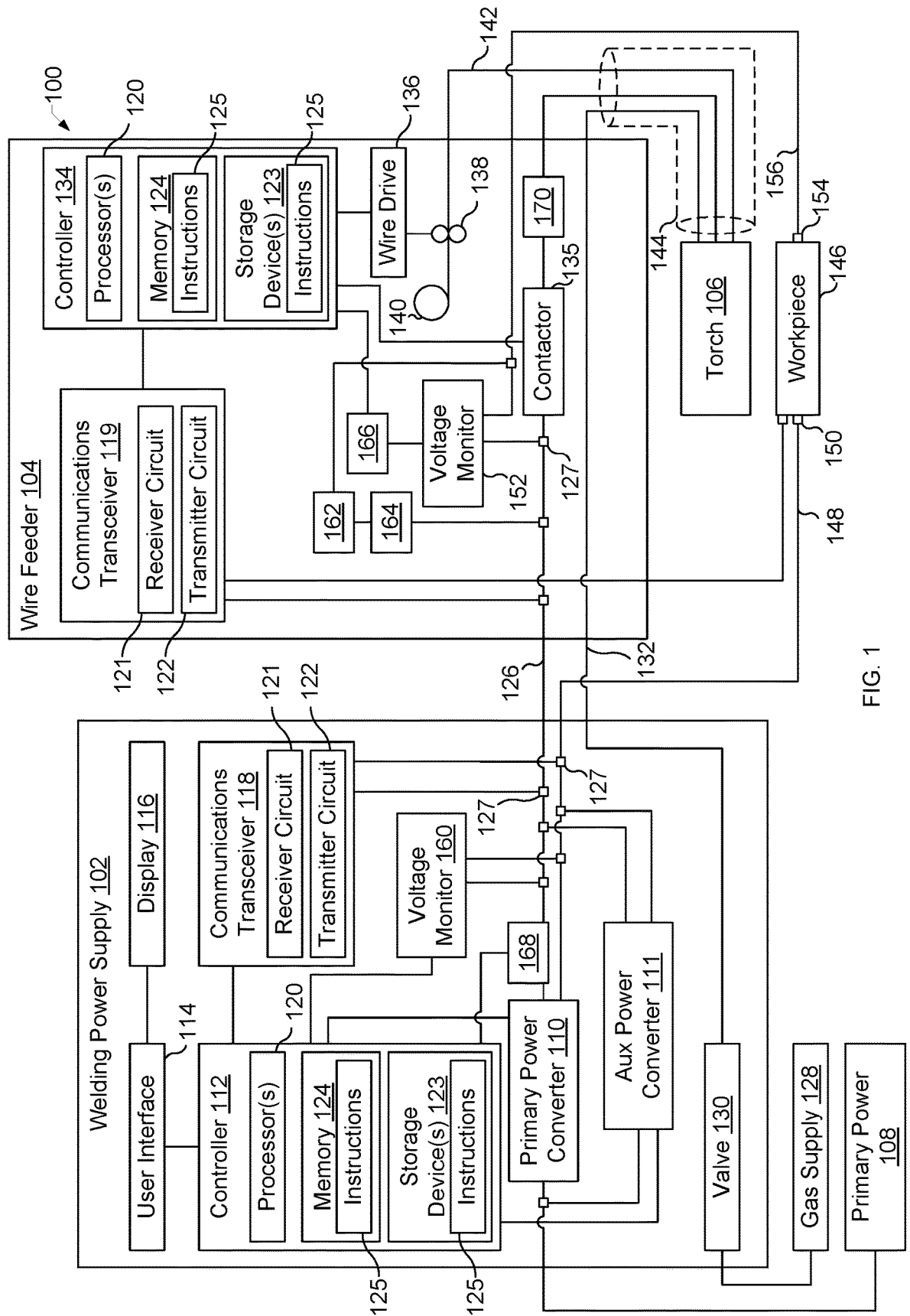
FIG. 1 shows an example welding-type system in accordance with aspects of this disclosure.

Weld cable communications enable components of welding systems, such as a welding power supply and a wire feeder, to communicate via a same cable used to deliver welding current from the power supply to the wire feeder (and to a welding torch attached to the wire feeder). Weld cable communications enable a simplification of a welding system by, for example, removing one or more cables that were conventionally used for control signals.

Disclosed examples perform an initial resistance measurement of a portion of a weld circuit. In some examples, the initial resistance measurement involves generating a current pulse in the weld circuit and measuring weld circuit voltages on both sides of a portion of the weld circuit for which the resistance is to be determined. The weld circuit voltages and the current may then be used with Ohm's law to calculate a resistance of the portion of the weld circuit. The power supply may use the resistance as an initial compensation value to generate a weld voltage that is close to a weld voltage setpoint. While other methods determine voltage drops between the power supply and the welding arc, disclosed examples reduce or eliminate the need for the operator to discard an initial weld joint created while the system adjusts the welding voltage to compensate for weld cable resistance losses.

As used herein, the term "port" refers to one or more terminals(s), connector(s), plug(s), and/or any other physical interface(s) for traversal of one or more inputs and/or outputs. Example ports include weld cable connections at which a weld cable is physically attached to a device, a gas hose connector that may make physical and/or electrical connections for input and/or output of electrical signals and/or power, physical force and/or work, fluid, and/or gas.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "weld circuit" includes any and all components in an electrical path of a welding operation, regardless whether the welding operation is underway. For example, the weld circuit is considered to include any or all of: power conversion and/or conditioning component(s), weld cable conductor(s), weld torch(es), consumable or non-consumable welding electrode(s), workpiece(s), work clamp(s), ground cable(s) (return cables), weld cable connections (e.g., weld studs that connect a welding power supply to a weld cable). As used herein, the "weld circuit" does not include components or conductors that do not conduct weld current at any time (i.e., that are not in the electrical path of the weld current). For example, the weld circuit does not include separate control cables that transmit data but do not transmit weld current.

As used herein, the term "filtering," as it applies to voltage and/or current values, refers to generating one or more representative values from a larger set of values. For example, a set of voltage values or measurements may be filtered to obtain an average voltage, a root-mean-square value of the voltage values, or any other representative or derivative value(s).

Disclosed example welding-type power supplies include a power converter, a voltage monitor, a receiver circuit, and a controller. The power converter converts input power to output a current pulse via a weld circuit and converts the input power to output welding-type power via the weld circuit. The voltage monitor measures a power supply output voltage of the current pulse. The receiver circuit receives, via the weld circuit, a communication comprising a second voltage measurement. The controller determines a resistance of a portion of the weld circuit based on the power supply output voltage measurement, the second voltage measurement, and a weld circuit current measurement, and controls the power converter to convert the input power to output the welding-type power based on a weld voltage setpoint and the resistance.

Some example welding-type power supplies further include an auxiliary power circuit to output power via the weld circuit. In some examples, the power converter generates the current pulse having a predetermined current and a predetermined duration. Some examples further include a current monitor to obtain the weld circuit current measurement in the weld circuit in response to the current pulse. In some examples, the controller is configured to control the power converter to increase a voltage of the welding-type power from the weld voltage setpoint based on the resistance.

In some example welding-type power supplies, the controller controls the power converter to output the current pulse in response to initialization of the welding-type power supply. Some examples further include a transmitter circuit to transmit a second communication via the weld circuit, in which the controller controls the power converter to output the current pulse in response to the receiver circuit receiving a third communication via the weld circuit.

In some examples, the receiver circuit receives a second communication via the weld circuit while the welding-type power is flowing through the weld circuit, in which the second communication including weld voltage feedback information measured at a device remote from the welding-type power supply. The controller controls the power converter to output the welding-type power according to a voltage feedback loop using the weld voltage feedback information to adjust the modified weld voltage setpoint and to regulate a weld voltage at the remote device based on the adjustment to the modified weld voltage setpoint. In some examples, the controller subtracts a second impedance associated with a voltage sense lead in the weld circuit to determine the resistance of the portion of the weld circuit. In some examples, the voltage monitor samples voltage measurements to determine at least one of a peak voltage, an average voltage or a root-mean-square (RMS) voltage, the controller configured to determine the power supply output voltage as the average voltage or the RMS voltage.

Disclosed example welding devices include a receiver circuit to receive a first communication via a weld circuit, a transmitter circuit to transmit a response to the first communication via the weld circuit, and a voltage monitor to measure a voltage of a current pulse received via the weld circuit in response to detecting the current pulse following transmission of the response. The transmitter circuit transmits a second communication based on the measured voltage of the current pulse via the weld circuit.

In some examples, the voltage monitor samples the voltage of the current pulse received via the weld circuit to determine a peak voltage, and the transmitter circuit transmits the second communication based on the peak voltage. Some examples further include a current monitor to measure current in the weld circuit in response to detecting the current pulse, in which the transmitter circuit transmits the second communication based on the measured current.

Some example welding devices further include an energy storage circuit to store energy received via the weld circuit prior to the receiver circuit receiving the first communication and power the transmitter circuit and the voltage monitor during the current pulse using the energy. In some examples, the welding device is a wire feeder or a pendant control device. In some examples, the voltage monitor measures a voltage of welding-type power received via the weld circuit during a welding-type operation after the current pulse. The transmitter circuit transmits, via the weld circuit during output of the welding-type power, a third communication based on the voltage of the welding-type power or stores the voltage of the welding-type power in a memory and transmits the third communication via the weld circuit after output of the welding-type power has stopped. Some such examples further include a user interface to receive a user selection of a voltage setpoint, in which the transmitter circuit transmits a fourth communication indicative of the user selection of the voltage setpoint.

Some examples further include a controller to calculate an arithmetic mean or a root-mean-square (RMS) value of a plurality of voltage samples measured by the voltage monitor, and the transmitter circuit includes the arithmetic mean or the RMS value in the second communication. In some examples, the transmitter circuit includes accumulated voltage samples measured by the voltage monitor in the second communication. Some examples further include a voltage filter circuit to provide a filtered value of the voltage over a time period, in which the transmitter circuit includes the filtered value in the second communication.

Turning now to the drawings, FIG. 1 is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1 includes a wire feeder 104 (e.g., for GMAW or FCAW welding), the wire feeder 104 may be replaced by any other type of remote accessory device, such as a stick welding and/or TIG welding remote control interface that provides stick and/or TIG welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes a power converter 110, which may include transformers, rectifiers, switches, and so forth, capable of converting the AC input power to AC and/or DC output power as dictated by the demands of the system 100 (e.g., particular welding processes and regimes). The power converter 110 converts input power (e.g., the primary power 108) to welding-type power based on a weld voltage setpoint and outputs the welding-type power via a weld circuit.

In some examples, the power converter 110 is configured to convert the primary power 108 to both welding-type power and auxiliary power outputs. However, in other examples, the power converter 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a controller 112 to control the operation of the power supply 102. The power supply 102 also includes a user interface 114. The controller 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include a display 116 for presenting, showing, or indicating, information to an operator. The controller 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1, the controller 112 communicates with the wire feeder 104 via the weld circuit via a communications transceiver 118, as described below.

The controller 112 includes at least one controller or processor 120 that controls the operations of the power supply 102. The controller 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power converter 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented based on various types of power line communications methods and techniques. For example, the communications transceiver 118 may utilize IEEE standard P1901.2 to provide data communications over the weld cable 126. In this manner, the weld cable 126 may be utilized to provide welding power from the power supply 102 to the wire feeder 104 and the welding torch 106. Additionally or alternatively, the weld cable 126 may be used to transmit and/or receive data communications to/from the wire feeder 104 and the welding torch 106. The communications transceiver 118 is communicatively coupled to the weld cable 126, for example, via cable data couplers 127, to characterize the weld cable 126, as described in more detail below. The cable data coupler 127 may be, for example, a voltage or current sensor.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. As described in more detail below, the communications transceiver 118 enables remote configuration of the power supply 102 from the location of the wire feeder 104 and/or compensation of weld voltages by the power supply 102 using weld voltage feedback information transmitted by the wire feeder 104. In some examples, the receiver circuit 121 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 102 (e.g., the wire feeder 104) while the weld current is flowing through the weld circuit.

Example implementations of the communications transceiver 118 are described in U.S. Pat. No. 9,012,807. The entirety of U.S. Pat. No. 9,012,807 is incorporated herein by reference. However, other implementations of the communications transceiver 118 may be used.

The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 22 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power converter 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146.

The example wire feeder 104 of FIG. 1 includes a voltage monitor 152 coupled to the weld circuit (e.g., electrically connected to the weld cable 126) and to the workpiece 146 via a clamp 154 and a sense lead 156. The example voltage monitor 152 may be coupled to the weld circuit via a cable data coupler 127. The voltage monitor 152 measures a weld voltage, such as the voltage between the output to the torch 106 (e.g., at a weld output connector or stud to which the cable 144 is connected to electrically connect the torch 106 to the wire feeder 104) and the workpiece 146 (e.g., via the sense lead 156). Because the wire feeder 104 is significantly closer to the arc than the power supply 102 is to the arc, the voltage measured at the wire feeder 104 is not affected by the impedance of the weld cable 126. As a result, the measurements captured by the voltage monitor 152 can be considered to be representative of the arc voltage.

The voltage monitor 152 captures one or more measurements (e.g., samples) of the weld voltage (e.g., the arc voltage, the voltage between the torch 106 and the workpiece 146). In some examples, the voltage monitor 152 assigns time stamps to the measurements for use in performing calculations, compensation, and/or matching of measurements to other measurements.

The example voltage monitor 152 and/or the controller 134 perform filtering (e.g., analog and/or digital filtering) to determine a representative value of the voltage over a designated time period. The representative value may be a filtered voltage value based on the measurements captured by the voltage monitor 152, such as an average voltage over the designated time period or a root-mean-square voltage over the designated time period. For example, the voltage monitor 152 and/or the controller 112 may calculate an average weld voltage for an N second time period based on a corresponding number of measurements captured by the voltage monitor 152 at a designated rate. In some examples, the time period for filtering is selected based on the switching frequency of the power converter 110 and/or a processing frequency used by the controller 134 and/or the processor(s) 120.

The example controller 134 stores the average weld voltage(s) and/or the voltage measurement(s) as weld voltage feedback information. The communications transceiver 119 transmits the weld voltage feedback information to the power supply 102 via the weld circuit (e.g., via the weld cable 126). The communications transceiver 119 may transmit the weld voltage feedback information while the weld circuit is conducting welding current (e.g., during a welding operation and/or while an arc is present between the torch 106 and the workpiece 146) and/or after the welding current is finished (e.g., at the conclusion of the welding operation during which the voltage monitor 152 captured the voltage measurements).

In some examples, the weld voltage feedback information includes a characteristic of the weld cable 126 such as a model number or other identifier of the weld cable 126 that can be used to accurately compensate the weld voltage for the drop over the weld cable 126. For example, if a model of weld cable has a determinable impedance without measurements, the controller 112 can use the identification of that weld cable to compensate the output from the power converter 110.

When the power supply 102 receives the voltage measurements, the power supply 102 updates a voltage feedback loop for controlling the power converter 110. The voltage feedback loop may be executed by the example controller 112 of FIG. 1. An example voltage feedback loop is a control algorithm that controls an output voltage using an input value and which is responsive to the output voltage and/or an intermediate signal associated with the output voltage. The controller 112 controls the welding-type power output by the power converter 110 according to a voltage feedback loop using the weld voltage feedback information to regulate the voltage at the remote device (e.g., at the wire feeder 104) to the weld voltage setpoint. For example, the controller 112 may use data received from the wire feeder 104 via the weld circuit to control the weld voltage at the arc to substantially equal the voltage setpoint (e.g., to compensate for the voltage drop caused by the weld cable 126).

The example power supply 102 includes a voltage monitor 160 that measures an actual power source output voltage. The actual power source output voltage is an approximation that is substantially equal to, but may be slightly different (e.g., a negligible difference) than, the real voltage that is output from the power source to the weld cable 126. The controller 112 may execute a feedback loop using the actual power source output voltage as an input. In some examples, the voltage monitor 160 is included in the power converter 110.

In some examples, the controller 112 receives an average arc voltage of the welding-type power measured at the wire feeder 104, and the voltage monitor 160 determines an average output voltage of the welding-type power measured at an output terminal of the power supply 102. The controller 112 adjusts a weld voltage of the welding-type power based on a difference between the average arc voltage and the average power supply output voltage.

In some examples, the voltage feedback loop is a constant voltage (CV) or voltage-controlled control loop. The example controller 112 calculates a current adjustment using a set of measurable and/or derivable voltage values.

As mentioned above, the weld cable 126 between the power supply 102 and the wire feeder 104 causes a voltage drop. The voltage drop caused by the weld cable 126 ($V_{cabledrop}$) can be expressed as a difference between a voltage measured at the power supply output (e.g., $V_{stud}$, measured across the power supply output studs or ports) and a voltage measured at the wire feeder 104 (e.g., $V_{feeder}$), as expressed in Equation 1 below. The $V_{feeder}$ term is received as the weld voltage feedback information, such as a weld voltage measurement and/or average weld voltage determined by the wire feeder 104 and communicated via the weld cable 126.

$$V_{cableDrop} = V_{stud} - V_{feeder} \qquad \text{Equation 1}$$

Adjusting the voltage output by the power converter 110 (e.g., $V_{stud}$) by the voltage drop in the weld cable 126 (e.g., $V_{cableDrop}$) effectively raises the voltage at the wire feeder 104 (e.g., $V_{feeder}$). Thus, the example controller 112 may adjust the power (e.g., voltage and/or current) output by the power converter 110 to cause the voltage at the wire feeder 104 (e.g., effectively the weld voltage or arc voltage) to substantially match a voltage setpoint.

The example controller 112 adjusts the voltage setpoint (e.g., $V_{cmd}$) to determine an adjusted voltage setpoint $V_{adjustedcmd}$ (e.g., an adjusted voltage command) according to Equation 2 below.

$$V_{AdjustedCmd} = V_{cmd} + V_{cableDrop} \qquad \text{Equation 2}$$

When the power supply 102 receives an average voltage measurement from the wire feeder 104 and generates average voltage measurements via the voltage monitor 160, the controller 112 controls the voltage of the welding-type power by determining an adjusted weld voltage setpoint (e.g., $V_{AdjustedCmd}$) based on the weld voltage setpoint (e.g., $V_{cmd}$) and the difference between the average arc voltage and the average power supply output voltage (e.g., an average $V_{cabledrop}$).

An error term $V_{error}$ may be calculated by the relationship shown in Equation 3 below.

$$V_{error} = (V_{AdjustedCmd} - V_{stud}) \qquad \text{Equation 3}$$

Figure 2:
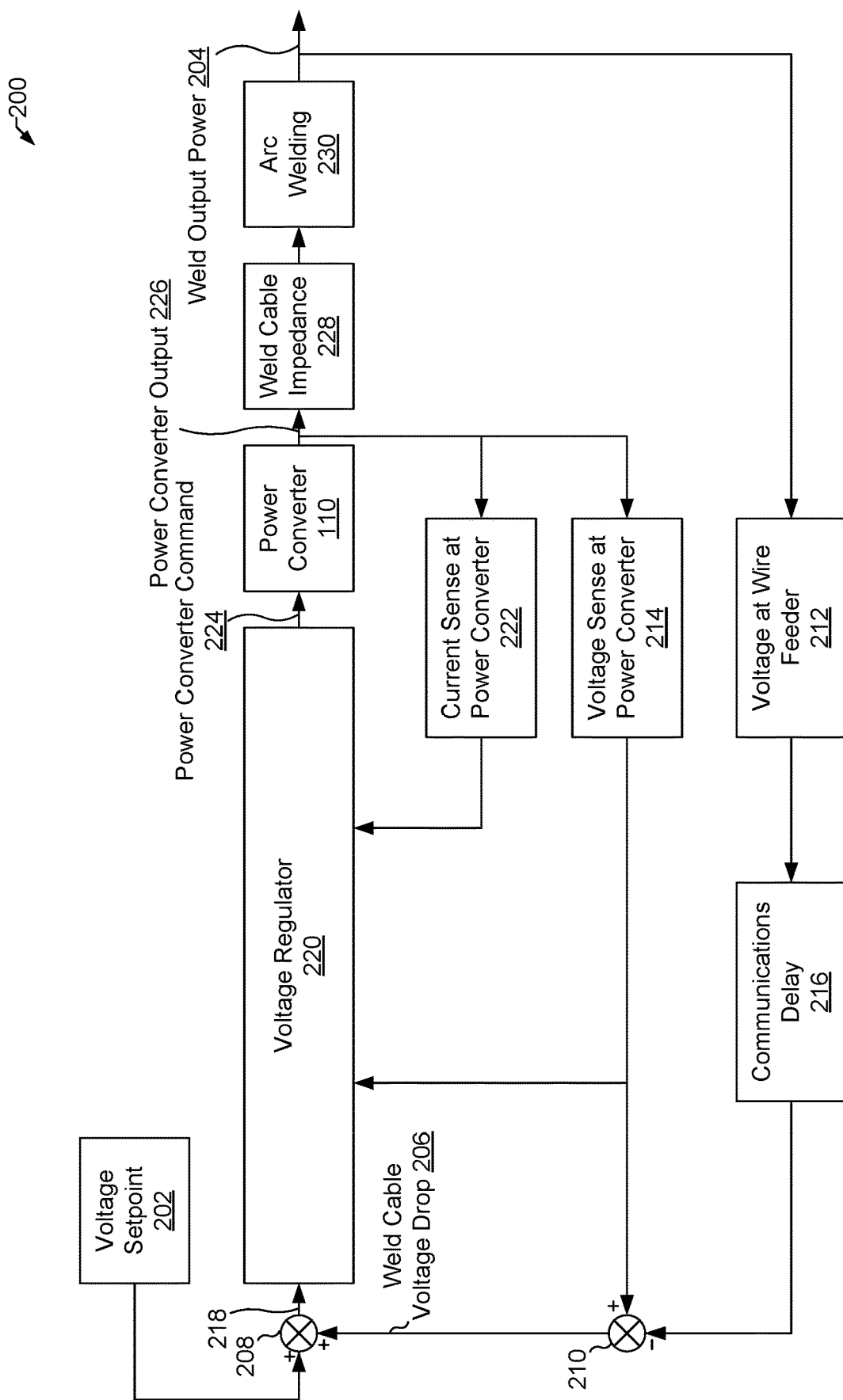
FIG. 2 is a block diagram of an example voltage feedback control loop that may be implemented by the controller of FIG. 1 to control a power converter in accordance with aspects of this disclosure.

By implementing Equation 3, the controller 112 may adjust the welding-type power based on a difference between the adjusted voltage setpoint and the average power supply output voltage. In the example of FIGS. 1 and 2, $V_{error}$ is used directly in calculating a new current command. If the adjusted voltage error is not used, calculating the output of the power converter 110, that output will not converge to an expected solution.

The example equations may be implemented by the controller 112 to control the voltage of the welding-type power output by the power converter 110 according to the voltage feedback loop by adjusting a voltage compensation value (e.g., $V_{error}$) applied to the welding-type power based on the weld voltage setpoint (e.g., $V_{cmd}$) and a measured voltage included in the weld voltage feedback information (e.g., $V_{feeder}$). In some examples, the controller 112 stores the voltage compensation value for generating the welding-type power for subsequent welding-type operations. The controller 112 may then adjust the voltage of the welding-type power output by the power converter 110 based on the voltage compensation value during the subsequent weld.

The controller 112 may control the voltage of the welding-type power output by the power converter 110 based on multiple communications received via the weld circuit, where the multiple communications correspond to multiple voltage measurements (e.g., $V_{feeder}$ values) by the wire feeder 104. For example, the controller 112 may store multiple power supply voltage measurements (e.g., $V_{stud}$ values) and/or weld current measurements that correspond to the plurality of voltage measurements (e.g., $V_{feeder}$ values), and determine the voltage compensation value based on the weld voltage measurements, the power supply output voltage measurements and/or the weld current measurements. The voltage compensation value may be determined by calculating an impedance of the weld cable 126 and/or by performing a lookup of weld voltage measurements, power supply output voltage measurements and/or weld current measurements in a table stored in the storage device 123 and/or in the memory 124.

In some examples, the control equation implemented by the controller 112 is executed with a first execution rate (e.g., 20 kHz, or one command update every 50 µs, while the weld voltage feedback information (e.g., $V_{feeder}$) is updated at a second rate that may be limited by the weld cable bandwidth (e.g., 2 Hz, or one weld voltage update every 500,000 µs). The different update rates result in a multi-rate control system, in which reported voltage data from the wire feeder 104 that could be sampled or delivered at any point during a welding operation is used in a higher-speed control loop.

The example controller 112 avoids an unstable control loop situation caused by the data update rate mismatch and non-uniform network data arrival (e.g., variable sampling interval) by: 1) using low-pass filtered data for the voltage setpoint $V_{cmd}$ and the weld voltage feedback information $V_{feeder}$ to calculate the weld cable voltage drop $V_{cableDrop}$ and the adjusted voltage setpoint $V_{AdjustedCmd}$; 2) calculating the adjusted voltage setpoint $V_{AdjustedCmd}$ when a valid weld voltage feedback information $V_{feeder}$ arrives via the weld cable 126 and use the most recently calculated value for the adjusted voltage setpoint $V_{AdjustedCmd}$ (e.g., until the next weld voltage feedback information arrives and a new value for the adjusted voltage setpoint is calculated); and 3) on start-up of the welding power supply, setting the adjusted voltage setpoint $V_{AdjustedCmd}$ to a maximum allowed value of the adjusted voltage setpoint $V_{AdjustedCmd}$ and allowing the system to adjust to the actual measured voltage drops.

In some examples, the controller 112 controls the voltage of the welding-type power output by the power converter according to the voltage feedback loop by adjusting the welding-type power while the weld current is being output through the weld circuit (e.g., instead of making adjustments between welds). Additionally or alternatively, the controller 112 makes the adjustments between welding operations (e.g., adjusts a voltage for a subsequent welding operation to compensate for a voltage error observed during a prior welding operation).

In some examples, the display 116 displays the weld voltage feedback information, such as the measured weld voltage, for real-time viewing of the actual weld voltage by an operator or other viewer of the power supply 102. Additionally, the user interface 114 may permit selection of the weld voltage and/or the power supply output voltage for display on the display device 116. By displaying (or permitting display) of the real-time weld voltage during the weld, the operator, supervisor, and/or any other interested viewer can be assured that the weld voltage specified by the user is the weld voltage at the arc. Such assurance may be useful for verifying compliance with a weld procedure specification.

Prior to performing welding, the example power supply 102 does not have a reliable measure of the weld circuit resistance. As a result, the welding operator may have to weld at a potentially incorrect voltage for a period of time while a feedback mechanism determines the proper amount of voltage adjustment to be used to obtain a weld voltage equal to the voltage setpoint. In instance in which a significant amount of voltage adjustment is necessary, the initial welding may be unstable, which could prevent the operation of the feedback mechanism.

The example system 100 of FIG. 1 determines an initial estimate of the resistance of the weld cable 126, which can then be refined using feedback techniques during welding. The power source provides low-voltage power to the wire feeder 104 via the auxiliary power converter 111. The auxiliary power converter 111 is capable of providing sufficient power to operate the controller 134, the communication transceiver 119, and the voltage monitor 152 within the wire feeder 104. The voltage output of the auxiliary power converter 111 is substantially less than that of the open-circuit voltage produced when the primary power converter 110 is enabled.

In some examples, the wire feeder 104 is equipped a current monitor 170 to measure weld circuit current in addition to the voltage monitor 152. The wire feeder 104 may include an energy storage device, such as an energy storage capacitor 162, isolated from the weld circuit through a diode bridge 164, such that no current flows when the weld circuit voltage is lower than the energy storage device charge voltage. Energy from the energy storage device 162 may be used to supply power to the controller 134 and other circuits of the wire feeder 104.

When the power supply 102 is turned on, the auxiliary power converter 111 applies power to the weld circuit. When the wire feeder 104 is connected, the power is sufficient to operate the controller 134 and the communications transceiver 119. Upon establishing communications between the power supply 102 and the wire feeder 104 via the weld circuit, the power supply 102 sends a message to the wire feeder 104 requesting a weld circuit resistance measurement. The wire feeder 104 replies to the message acknowledging the message to the power supply 102.

To measure resistance, the example power supply 102 delivers a current pulse to charge the energy storage device 162 in the wire feeder 104. The current pulse is performed by turning on the primary power converter 110 of the power supply 102 for a specified duration with a specified current limit. The duration and current limit may be selected to provide a satisfactory measurement accuracy. Current monitors in the power supply 102 and the wire feeder 104 may provide for a simultaneous trigger when the weld circuit current exceeds a specified threshold. In some examples in which precise measurement timing is not required (e.g., using peak measured voltage), the example controllers 112, 134 may collect voltage monitors 152, 160 may collect voltage measurements for a minimum time period following another trigger event.

Once triggered, the voltage monitor 160 of the power supply 102 and the voltage monitor 152 of the wire feeder 104 repeatedly sample and/or accumulate the weld circuit voltage at respective measurement locations in the weld circuit for the specified pulse duration. One or both of the power supply 102 and/or the wire feeder 104 also sample and/or accumulate current measurements. For example, the power supply 102 may measure the actual current with a current monitor 168 and/or the wire feeder 104 may measure the actual current with a current monitor 170. Current measurements generated by the current monitor 168 and/or the current monitor 170 may be filtered to determine, for example, an average current, a peak current, and/or an RMS current.

At the end of the current pulse, the wire feeder 104 sends a message to the power supply containing the accumulated voltage samples and/or a filtered result of the voltage samples. For example, a voltage filter circuit 166 generates a filtered value of the voltages measured by the voltage monitor 152 over a time period. Filtering may include determining an arithmetic mean of the voltage samples over the number of samples taken, determining an RMS value of the voltage samples, and/or determining a peak voltage from the voltage samples.

Upon receipt of the message from the wire feeder 104, the power supply 102 computes the weld circuit resistance using Ohm's law (e.g., resistance R=(power_source_filtered_voltage−wire_feeder_filtered_voltage)/power_source_filtered_current)). As the current pulse flows through the wire feeder 104 sense lead 156, the controller 134 may subtract an estimate of the sense lead resistance from the measured resistance. When the resistance measurement is determined by the controller 134, the power supply 102 may use the measured resistance as the initial value for determining a weld cable voltage drop and control the primary power converter 110 to increase an output voltage from a voltage setpoint and/or further refine the weld cable voltage drop measurement as disclosed in U.S. patent application Ser. No. 15/238,585 and U.S. patent application Ser. No. 15/238,589.

FIG. 2 is a block diagram of an example voltage feedback control loop 200 that may be implemented by the controller 112 of FIG. 1 to control the power converter 110. For example, the controller 112 may implement the control loop 200 by executing the instruction 125. The control loop 200 receives a voltage setpoint 202 as an input and generates a weld output power 204 that has substantially the same voltage as the voltage setpoint 202.

In the control loop 200, the voltage setpoint 202 is added to a weld cable voltage drop 206 using a summer 208. The weld cable voltage drop 206 is determined at a summer 210 as a difference between a wire feeder voltage 212 and a voltage 214 sensed at the power converter 110. The wire feeder voltage 212 is substantially identical to the voltage of the weld output power 204, and may incur a communications delay 216 that controls the use of the wire feeder voltage 212 and/or the weld cable voltage drop 206 in the control loop 200 (e.g., the summer 208 may receive the weld cable voltage drop 206 at a rate that is different than the execution rate of the control loop 200).

The summer 208 outputs a voltage error 218 to a voltage regulator 220. The voltage regulator 220 receives the voltage error 218, the voltage 214 sensed at the power converter 110, and a current 222 sensed at the power converter 110. The voltage regulator 220 outputs a power converter command 224 based on the voltage error 218, the voltage 214 sensed at the power converter 110, and the current 222 sensed at the power converter 110. The power converter command 224 controls the power converter 110 to generate an output power 226. The power converter 110 outputs the output power 226 to the weld cable 126, which has a corresponding weld cable impedance 228 in the control loop 200, and to a welding arc 230. The voltage 214 sensed at the power converter 110 and the current 222 sensed at the power converter 110 are measured substantially at the output of the power converter 110 to the weld cable 126.

In some other examples, the controller 134 in the wire feeder 104 implements portions of a control loop, such as the control loop 200 of FIG. 2 and/or the control scheme described above with respect to Equations 1-3, to control a weld voltage at the output of the wire feeder 104 to be substantially equal to a voltage setpoint. For example, the controller 134 may determine a difference between a measured weld voltage (e.g., from the voltage monitor 152) and the voltage setpoint. By determining a difference between the voltage measured at the wire feeder 104 and the voltage setpoint, the wire feeder 104 can feed back a difference or error value for use by the power supply 102

In some examples, the wire feeder 104 executes the control loop to determine a voltage command, and communicates the voltage command to the power supply 102 (e.g., using the communications transceiver 119) to be implemented by the power supply 102 to achieve the setpoint voltage at the weld voltage. The power supply 102 implements the commanded voltage by outputting the commanded voltage to the weld cable 126. In such examples, the wire feeder 104 has knowledge of the current voltage command at the power supply. As such, the example wire feeder 104 may measure a current flowing through the weld cable 126 and use the current, the voltage command, and the voltage measured at the wire feeder 104 to characterize the impedance of the weld cable 126.

In some other examples, the example power supply 102 and/or the example wire feeder 104 are not, by themselves, capable of communicating via a weld circuit. Instead, the example power supply 102 and/or the example wire feeder 104 are provided with respective weld communication adapter(s) to enable the system 100 to compensate a weld voltage for a voltage drop caused by the weld cable 126 during a welding operation. Examples of such communications adapters are disclosed in U.S. patent application Ser. No. 15/238,585 and U.S. patent application Ser. No. 15/238,589. In some such examples, the communications adapters implement the voltage monitors 152 and 160 and/or a current monitor, and communicate voltage measurements and/or current measurements to the controller 112 for determination of the initial weld circuit resistance.

Figure 3:
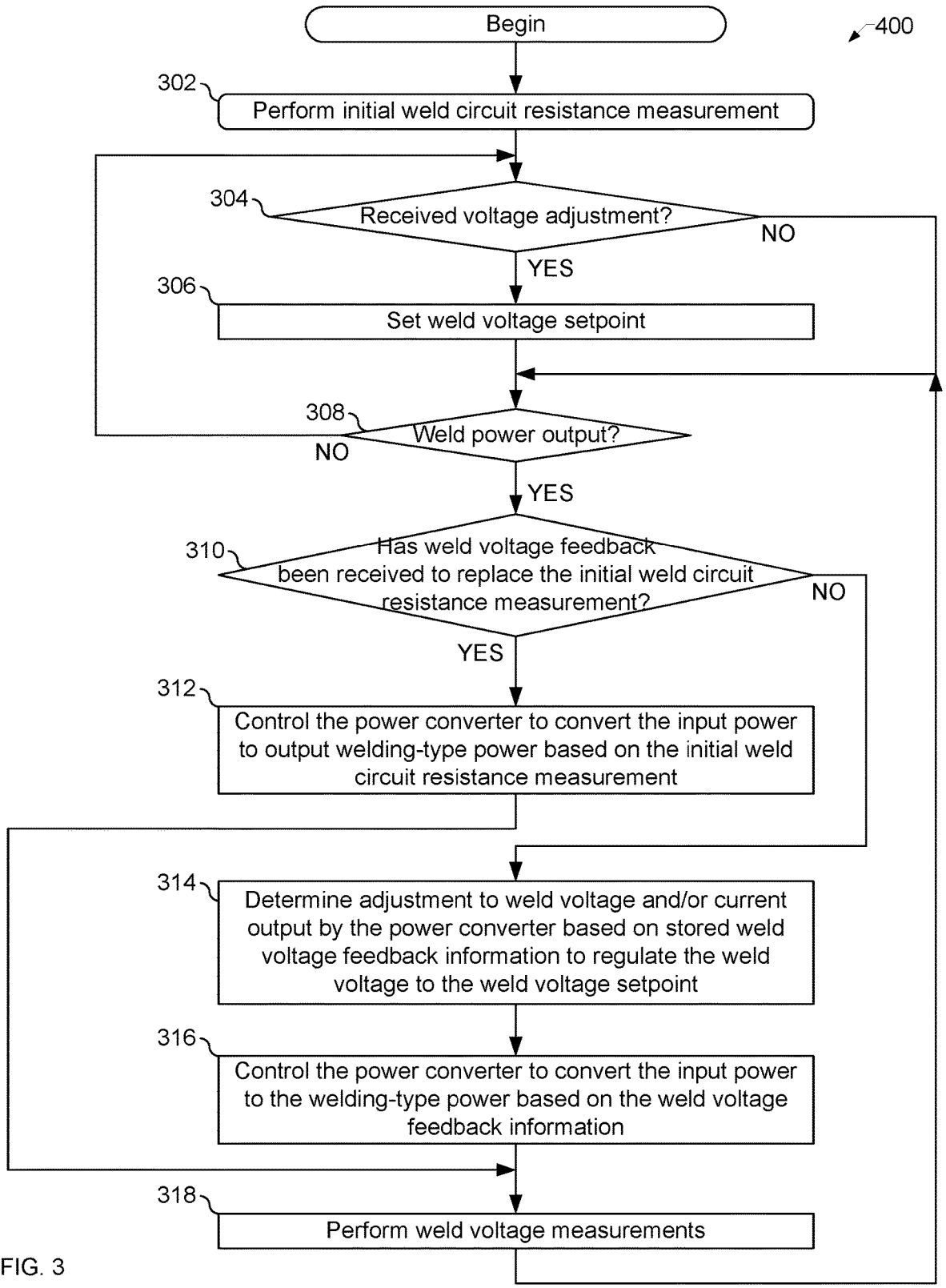
FIG. 3 is a flowchart illustrating example machine readable instructions which may be executed by the example welding-type power supply of FIG. 1 to compensate welding output voltage.

FIG. 3 is a flowchart illustrating example machine readable instructions 300 which may be executed by the example welding-type power supply 102 of FIG. 1 to compensate welding output voltage.

At block 302, the controller 112 of the power supply 102 performs an initial weld resistance measurement. The initial weld resistance measurement may be performed prior to a first weld ever performed using the power supply 102, prior to a first weld ever performed using the power supply 102 following powering on of the power supply 102, prior to a first weld ever performed using the power supply 102 after connection of the weld cable, and/or prior to a first weld ever performed using the power supply 102 after connection to the wire feeder 104. Example instructions for implementing block 302 are described below with reference to FIG. 4. The example block 302 returns a resistance measurement for a portion of the weld circuit, such as a resistance of the weld cable 126 connected between the power supply 102 and the wire feeder 104.

At block 304, the controller 112 determines whether a voltage adjustment has been received. For example, controller 112 may identify a change to a voltage setpoint received via the user interface 114. If a voltage adjustment has been received (block 304), at block 306 the controller 112 sets the weld voltage setpoint.

After setting the weld voltage setpoint (block 306), or if a voltage adjustment has not been received (block 304), at block 308 the controller 112 determines whether weld power is being output by the power converter 110. For example, the controller 112 may measure the current output by the power converter 110 to determine whether the current is greater than a threshold. If the weld power is not being output (block 308), control returns to block 304.

When the weld power is being output (block 308), at block 310 the controller 112 determines whether weld voltage feedback has been received to replace the initial weld circuit resistance measurement. For example, when welding begins, the power supply 102 may receive the weld voltage feedback information from the wire feeder 104 and use the weld voltage feedback information to control the voltage output by the power converter 110. If weld voltage feedback has been received (e.g., has not been received since the weld circuit resistance measurement was performed in block 302) (block 310), at block 312 the controller 112 controls the power converter 110 to convert the input power to output welding-type power based on the initial weld circuit resistance measurement. For example, the controller 112 may control the power converter 110 to increase an output voltage above the weld voltage setpoint based on the initial weld circuit resistance measurement and the output current.

If weld voltage feedback has been received (block 310), at block 314 the controller 112 determines an adjustment to the weld voltage and/or the weld current output by the power converter 110 based on the stored weld feedback voltage information, to regulate the weld voltage to the weld voltage setpoint. For example, the controller 112 may execute a feedback loop to compensate for the voltage drop across the weld cable 126 between the power supply 102 and the wire feeder 104. At block 316, the controller 112 controls the power converter 110 to convert the input power to output welding-type power based on the weld voltage feedback information. Example implementations of block 314 and block 316 are disclosed in U.S. patent application Ser. No. 15/238,585 and U.S. patent application Ser. No. 15/238,589.

After controlling the power converter 110 based on the initial weld circuit resistance measurement (block 310) or controlling the power converter 110 based on the weld voltage feedback information (block 316), at block 318 the controller 112 performs weld voltage measurements. Example implementations of block 318 are described in U.S. patent application Ser. No. 15/238,585 and U.S. patent application Ser. No. 15/238,589. Control then returns to block 308.

Figure 4:
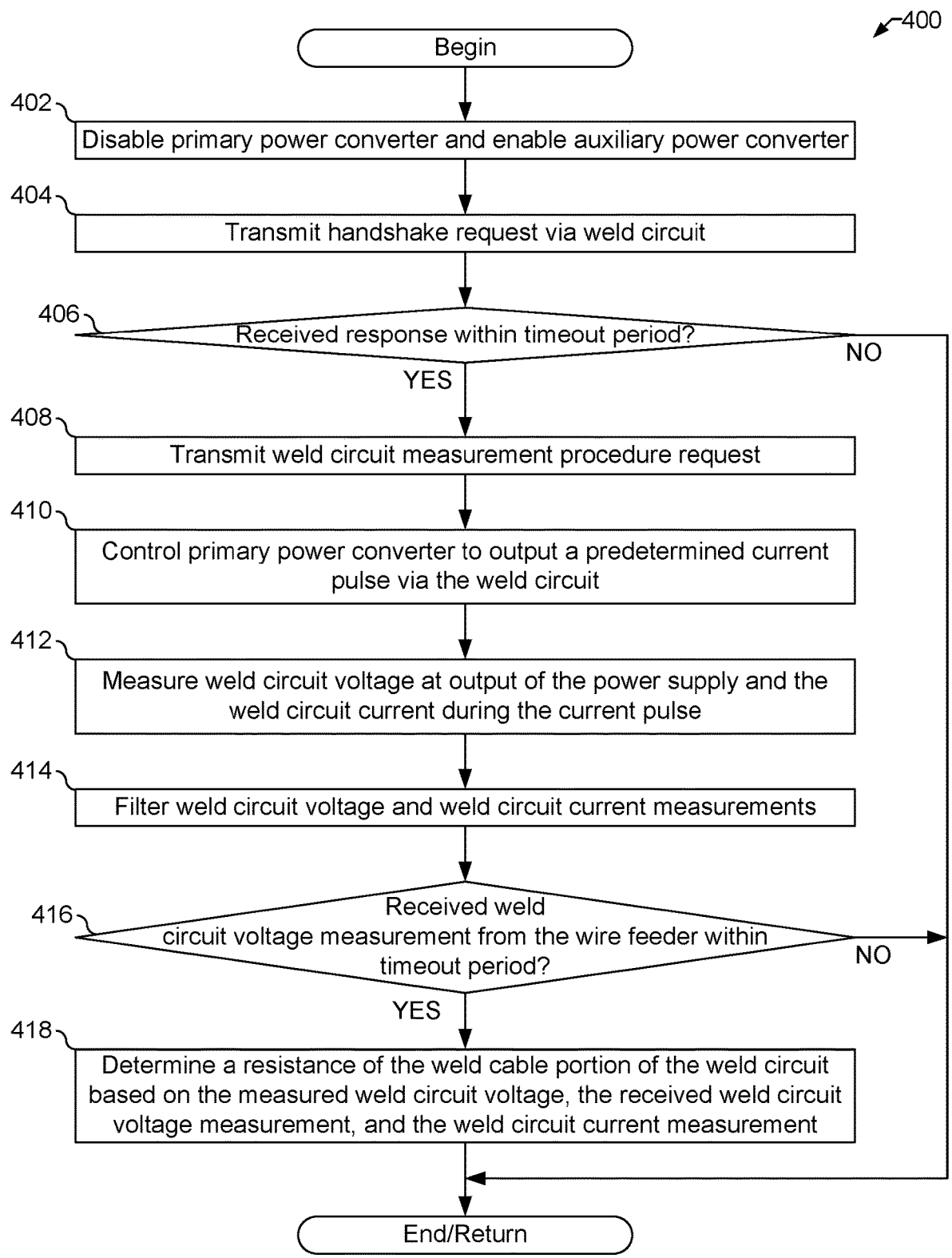
FIG. 4 is a flowchart illustrating example machine readable instructions which may be executed by the example welding-type power supply of FIG. 1 to perform a weld circuit resistance measurement.

FIG. 4 is a flowchart illustrating example machine readable instructions 400 which may be executed by the example power supply 102 of FIG. 1 to perform an initial weld circuit resistance measurement. The example instructions 400 of FIG. 4 may be executed by the controller 112 of the power supply 102 to implement block 302 of FIG. 3.

At block 402, the controller 112 disables the primary power converter 110 and enables the auxiliary power converter 111. The auxiliary power converter 111 provides sufficient power to the wire feeder 104 via the weld circuit to enable the wire feeder 104 to perform the initial weld circuit resistance measurement.

At block 404, the controller 112 transmits a handshake request (or other identifying communication) via the weld circuit (e.g., via the transmitter circuit 122). The handshake request may be used to identify a compatible wire feeder connected to the weld circuit and/or to determine whether the wire feeder 104 is capable of performing the initial weld circuit resistance measurement in cooperation with the power supply 102.

At block 406, the controller 112 determines whether a response to the handshake request has been received (e.g., via the weld circuit and the receiver circuit 121). For example, the wire feeder 104 may respond to the handshake request with a predetermined response via the weld circuit within a timeout period.

If the response is received (block 406), at block 408 the controller 112 transmits a weld circuit measurement procedure request (e.g., via the weld circuit and the transmitter circuit 122). At block 410, the controller 112 controls the primary power converter 110 to output a predetermined current pulse via the weld circuit. In some examples, the controller 112 disables or disconnects the auxiliary power converter 111 during the current pulse. The current pulse may have a predetermined peak current level, a predetermined duration, and/or any other specified qualities to improve measurement.

At block 412, the controller 112 measures the weld circuit voltage at the output of the power supply 102 and measures the weld circuit current during the current pulse. The controller 112 may receive voltage measurements from the voltage monitor 160 and/or receive current measurements from the primary power converter 110 or from the current monitor 168. At block 414, the controller 112 filters the weld circuit voltage and the weld circuit current measurements. For example, the controller 112 may filter the weld circuit voltage and/or the weld circuit current measurements to determine a peak voltage, an average voltage, a root-mean-square (RMS) voltage, a peak current, an average current, and/or an RMS current.

At block 416, the controller 112 determines whether weld circuit voltage measurements have been received from the wire feeder 104 (e.g., via the weld circuit and the receiver circuit 121) within a timeout period. The weld circuit voltage measurements may be filtered weld circuit voltage measurements, such as a peak voltage, an average voltage, and/or a root-mean-square (RMS) voltage, measured at the wire feeder 104.

If weld circuit voltage measurements have been received within the timeout period (block 416), at block 418 the controller 112 determines a resistance of the weld cable portion 126 of the weld circuit based on the measured weld circuit voltage (at the power supply 102), the received weld circuit voltage measurement (from the wire feeder 104), and the weld circuit current measurement.

After determining the resistance (block 418), if weld circuit voltage measurements are not received within the timeout period (block 416), or if a response to the handshake request has not been received (block 406), the example instructions 400 end and control returns to a calling function such as block 302 of FIG. 3.

While some disclosed examples use a predetermined current and/or a predetermined duration for the current pulse, other examples may use a current and/or a duration that are not predetermined (e.g., determined using an algorithm) by measuring the actual current of the current pulse. The actual current is then used to determine the resistance.

Figure 5:
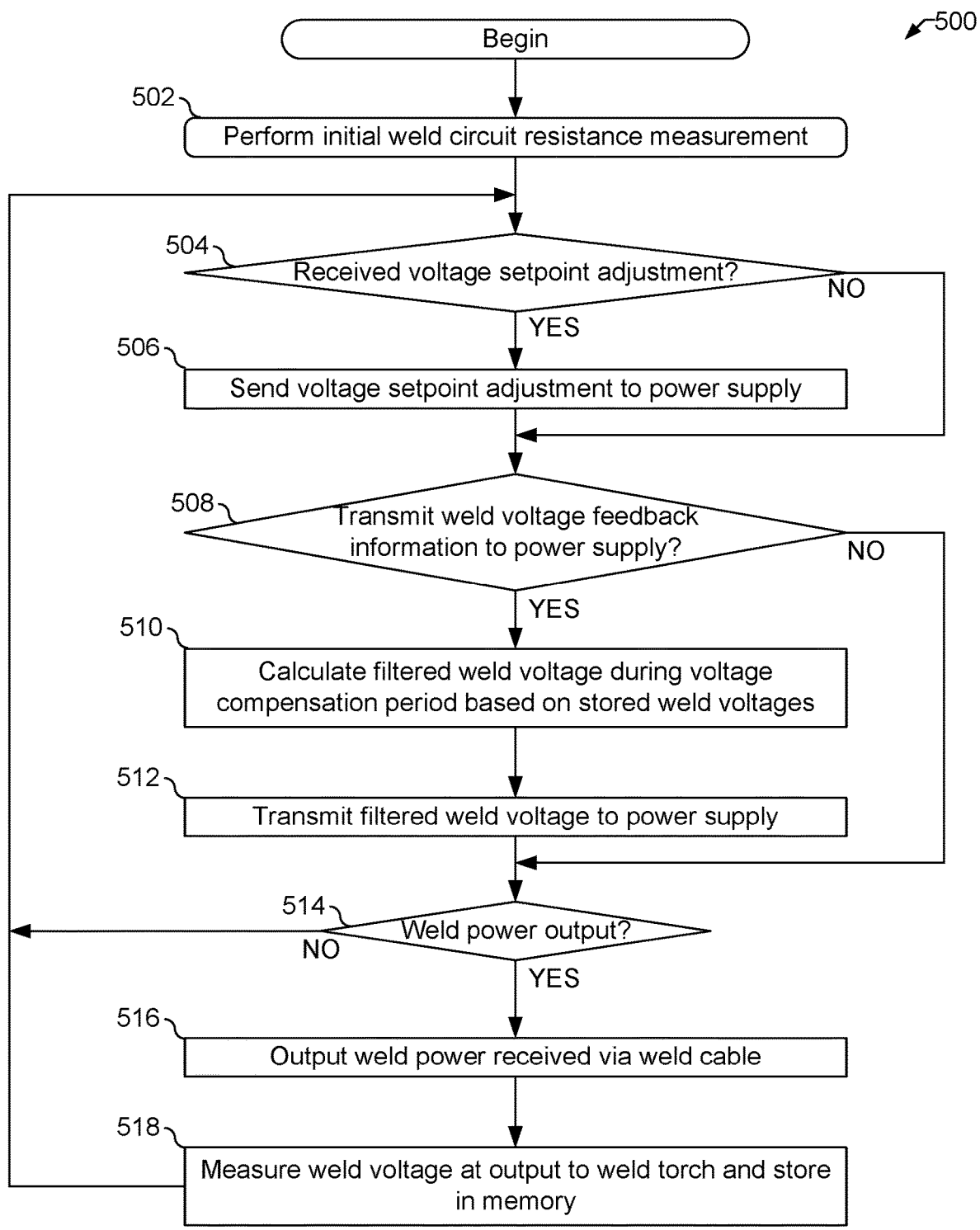
FIG. 5 is a flowchart illustrating example machine readable instructions which may be executed by the example wire feeder of FIG. 1 to compensate welding output voltage.

FIG. 5 is a flowchart illustrating example machine readable instructions 500 which may be executed by the example wire feeder 104 of FIG. 1 to compensate welding output voltage. The example instructions 500 may be executed by the wire feeder 104 in cooperation with the instructions 300 of FIG. 3 executed by the power supply 102, such as when the wire feeder 104 is provided with power from the auxiliary power converter 111 via the weld circuit.

At block 502, the controller 134 of FIG. 1 performs an initial weld circuit resistance measurement. The initial weld resistance measurement may be performed prior to a first weld ever performed using the power supply 102, prior to a first weld ever performed using the power supply 102 following powering on of the power supply 102, prior to a first weld ever performed using the power supply 102 after connection of the weld cable, and/or prior to a first weld ever performed using the power supply 102 after connection to the wire feeder 104. Example instructions for implementing block 502 are described below with reference to FIG. 6. The example block 502 returns a resistance measurement for a portion of the weld circuit, such as a resistance of the weld cable 126 connected between the power supply 102 and the wire feeder 104.

At block 504, the controller 134 determines whether a voltage setpoint adjustment has been received. For example, controller 134 may identify a change to a voltage setpoint received via a user interface of the wire feeder 104. If a voltage adjustment has been received (block 504), at block 506 the controller 134 sends the voltage setpoint adjustment to the power supply 102 via the weld circuit and/or the transceiver 119.

After sending the voltage setpoint adjustment (block 506), or if a voltage setpoint adjustment has not been received (block 504), at block 508, the controller 134 determines whether to transmit weld voltage feedback information to the power supply 102. For example, the controller 134 may track a number of voltage measurement samples taken by the voltage monitor 152 and, when the number of samples satisfies a threshold, generate and transmit the weld voltage feedback information. Additionally or alternatively, the controller 134 may generate and transmit the weld voltage feedback information in response to an event, such as a conclusion of a welding operation (e.g., detected as the weld current falling below a threshold current). In some examples, the controller 134 may generate and transmit the weld voltage feedback information based on a feedback frequency, which may be based on a communication bandwidth (e.g., the communication bandwidth of the weld circuit and the transceiver 119). In the example below, the weld voltage feedback information includes a filtered measured weld voltage over a number of samples and/or a time period. However, other weld voltage feedback information may be transmitted, such as a different representative weld voltage value, a voltage error value between a measured weld voltage and the weld voltage setpoint, a weld cable characteristic such as a calculated weld cable impedance or a weld cable identifier, and/or a voltage setpoint command.

If a condition is met to transmit weld voltage feedback information to the power supply 102 (block 508), at block 510 the voltage monitor 152 and/or the controller 134 calculates a filtered weld voltage during a voltage compensation period based on a set of stored arc voltages (e.g., in the memory 124 of the wire feeder 104). At block 512, the communications transceiver 119 transmits the filtered weld voltage to the power supply 102 (e.g., via the weld circuit including the weld cable 126). The communications transceiver 119 may also transmit a timestamp or other indicator of the time period represented by the filtered weld voltage. The timestamp may be used by the power supply to match the received weld voltage feedback information to voltage measurements taken by the voltage monitor 160 for comparison. In some examples, the example controller 134 clears stored weld voltages to free storage space for subsequent sampling. In some other examples, subsequent samples overwrite older samples in the memory 124.

After transmitting the filtered weld voltage (block 512), or if transmitting weld voltage feedback information to the power supply 102 is not performed (block 508), at block 514, the controller 134 determines whether weld power is to be output to a weld operation. For example, the controller 134 may determine whether a trigger of the weld torch 106 is depressed. If weld power is being output (block 514), at block 516, the wire feeder 104 outputs the weld power received via the weld cable 126 to the weld torch 106 for a welding-type operation (e.g., welding, wire preheating, workpiece preheating, etc.). The voltage monitor 152 measures the weld voltage at an output to the welding torch 106 and stores the measured voltage in the memory 124. Control then returns to block 504.

Figure 6:
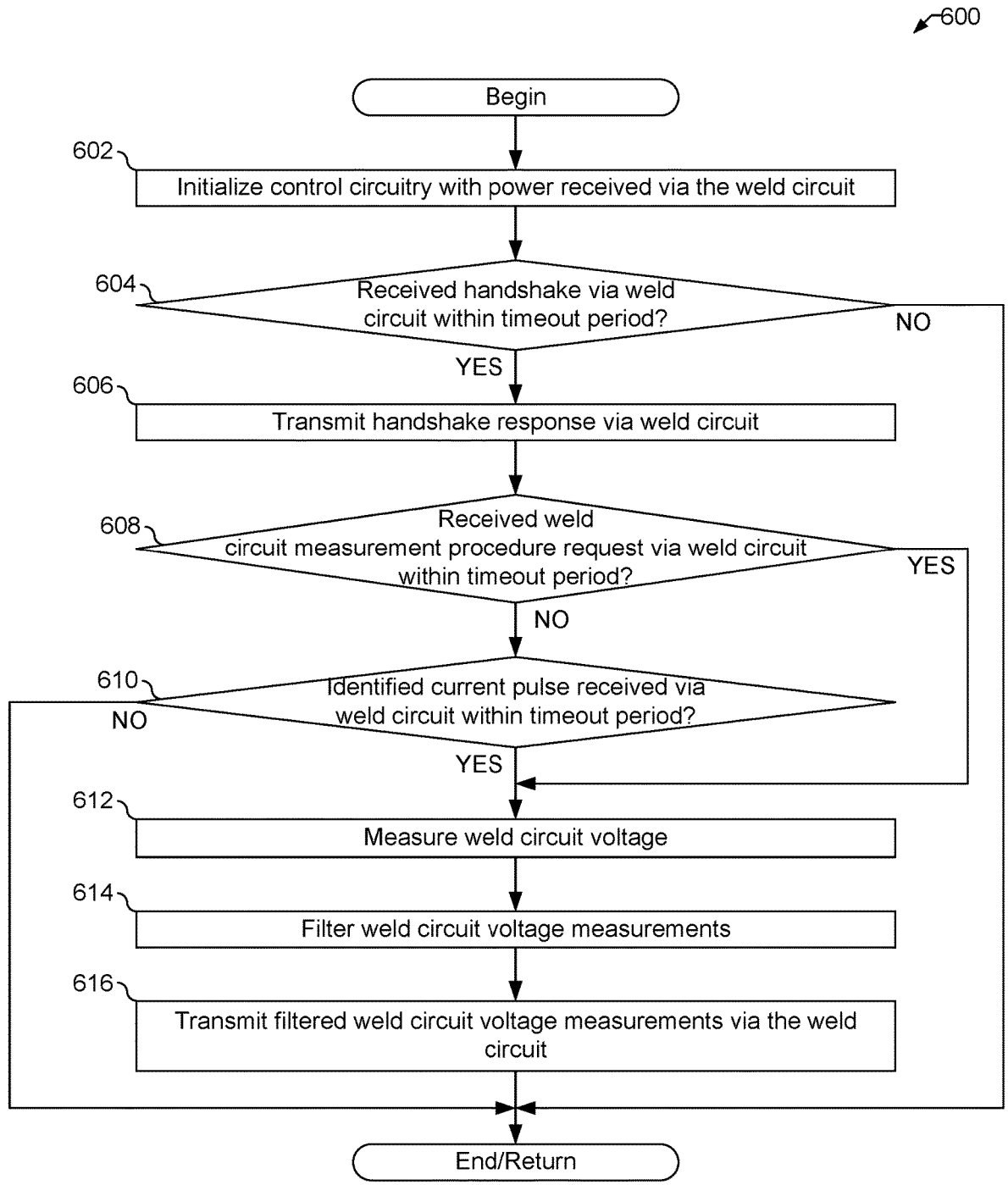
FIG. 6 is a flowchart illustrating example machine readable instructions which may be executed by the example wire feeder of FIG. 1 to perform a weld circuit resistance measurement.

FIG. 6 is a flowchart illustrating example machine readable instructions 600 which may be executed by the example wire feeder 104 of FIG. 1 to perform a weld circuit resistance measurement. The example instructions 600 may be executed by the wire feeder 104 in cooperation with the instructions 400 of FIG. 3 executed by the power supply 102 and/or to implement block 502 of FIG. 5.

At block 602, the wire feeder 104 initializes control circuitry (e.g., the controller 134) with power received via the weld circuit. For example, the controller 134 may be initialized using power received from the auxiliary power converter 111 via the weld circuit.

At block 604, the controller 134 determines whether a handshake has been received via the weld circuit (e.g., using the receiver circuit 121 of the wire feeder 104) within a timeout period. If a handshake has been received (block 604), at block 606 the controller 134 transmits a handshake response vi the weld circuit (e.g., via the transmitter circuit 122 of the wire feeder 104). For example, the handshake and/or the response may be predetermined communications or signals that enable the power supply 102 to identify that the wire feeder 104 is capable of performing the initial weld circuit resistance measurement.

At block 608, the controller 134 determines whether a weld circuit measurement procedure request has been received. The weld circuit measurement procedure request may be another predetermined communication, message, and/or series of signals known to the wire feeder 104. If a weld circuit measurement procedure request has not been received (block 608), the controller 134 determines whether an identified current pulse has been received via the weld circuit within a timeout period. For example, instead of identifying the weld circuit measurement procedure request, the wire feeder 104 may identify a specific current pulse as a weld circuit measurement current pulse.

If either the weld circuit measurement procedure request has been received (block 608) or the identified current pulse has been received via the weld circuit within a timeout period (block 610), at block 612 the controller 134 measures the weld circuit voltage using the voltage monitor 152. For example, the voltage monitor 152 may measure a voltage between the wire drive 136 and the sense lead 156. The controller 134 and the voltage monitor 152 take multiple voltage measurements for the duration of the current pulse.

At block 614, the filter circuit 166 filters the weld circuit voltage measurements. The controller 134 may filter the weld circuit voltage measurements, such as by determining a peak voltage, an average voltage, and/or a root-mean-square (RMS) voltage from the voltage measurements taken during the current pulse. At block 616, the controller 134 transmits (e.g., via the transmitter circuit 122 of the wire feeder 104) the filtered weld circuit voltage measurements via the weld circuit. In some other examples, the controller 134 transmits the voltage measurements and/or include accumulated voltage samples measured by the voltage monitor 152, which may be filtered by the power supply 102.

After transmitting the filtered weld circuit voltage measurements (block 616), if the weld circuit measurement procedure request has not been received (block 608) and the identified current pulse has not been received via the weld circuit within a timeout period (block 610), or if the handshake has not been received within the timeout period (block 604)

While the examples of FIGS. 3-6 disclose measuring the weld circuit current at the power supply 102, the weld circuit current may additionally or alternatively be measured at the wire feeder 104. The current measurements and/or filtered current measurements may be communicated to the power supply 102.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a power converter configured to:
      convert input power to output a current pulse via a weld circuit; and
      convert the input power to output welding-type power via the weld circuit;
   a voltage monitor configured to measure a first voltage measurement corresponding to a power supply output voltage of the current pulse;
   a receiver circuit configured to receive, via the weld circuit, a first communication comprising a second voltage measurement following transmission of current pulse; and
   a controller configured to:
      determine a resistance of a portion of the weld circuit based on the first voltage measurement, the second voltage measurement, and a weld circuit current measurement; and
      control the power converter to convert the input power to output the welding-type power based on a weld voltage setpoint and the resistance.

2. The welding-type power supply as defined in claim 1, further comprising an auxiliary power circuit configured to output power via the weld circuit.

3. The welding-type power supply as defined in claim 1, wherein the power converter is configured to generate the current pulse having a predetermined current and a predetermined duration.

4. The welding-type power supply as defined in claim 1, further comprising a current monitor configured to obtain the weld circuit current measurement in the weld circuit in response to the current pulse.

5. The welding-type power supply as defined in claim 1, wherein the controller is configured to control the power converter to increase a voltage of the welding-type power from the weld voltage setpoint based on the resistance.

6. The welding-type power supply as defined in claim 1, wherein the controller is configured to control the power converter to output the current pulse in response to initialization of the welding-type power supply.

7. The welding-type power supply as defined in claim 1, further comprising a transmitter circuit to transmit a second communication via the weld circuit, the controller configured to control the power converter to output the current pulse in response to the receiver circuit receiving a third communication via the weld circuit.

8. The welding-type power supply as defined in claim 1, wherein the receiver circuit is configured to receive a second communication via the weld circuit while the welding-type power is flowing through the weld circuit, the second communication including weld voltage feedback information measured at a device remote from the welding-type power supply, and the controller is configured to control the power converter to output the welding-type power according to a voltage feedback loop using the weld voltage feedback information to adjust the modified weld voltage setpoint and to regulate a weld voltage at the remote device based on the adjustment to the modified weld voltage setpoint.

9. The welding-type power supply as defined in claim 1, wherein the controller is configured to subtract a second impedance associated with a voltage sense lead in the weld circuit to determine the resistance of the portion of the weld circuit.

10. The welding-type power supply as defined in claim 1, wherein the voltage monitor is configured to sample voltage measurements to determine at least one of a peak voltage, an average voltage or a root-mean-square (RMS) voltage, the controller configured to determine the power supply output voltage as the average voltage or the RMS voltage.

* * * * *